United States Patent
Jiang et al.

(10) Patent No.: US 10,294,869 B2
(45) Date of Patent: May 21, 2019

(54) SYSTEM AND METHOD TO ENHANCE CORROSION TURBINE MONITORING

(71) Applicant: General Electric Company, Schenectady, NY (US)

(72) Inventors: Xiaomo Jiang, Atlanta, GA (US); Rebecca Evelyn Hefner, Greenville, SC (US); Bradford George Foulkes, Greenville, SC (US); Jianxiong Chen, Greenville, SC (US); John Robert Korsedal, Greenville, SC (US)

(73) Assignee: General Electric Company, Schenectady, NY (US)

(*) Notice: Subject to any disclaimer, the term of this patent is extended or adjusted under 35 U.S.C. 154(b) by 345 days.

(21) Appl. No.: 15/182,359

(22) Filed: Jun. 14, 2016

(65) Prior Publication Data
US 2017/0356346 A1    Dec. 14, 2017

(51) Int. Cl.
| | | |
|---|---|---|
| G08B 21/00 | (2006.01) | |
| F02C 7/30 | (2006.01) | |
| G05B 19/042 | (2006.01) | |
| F04D 27/02 | (2006.01) | |
| F02C 9/00 | (2006.01) | |
| G05B 13/02 | (2006.01) | |

(52) U.S. Cl.
CPC .............. *F02C 7/30* (2013.01); *F02C 9/00* (2013.01); *F04D 27/0292* (2013.01); *G05B 19/0428* (2013.01); *F05D 2260/607* (2013.01); *F05D 2260/80* (2013.01); *F05D 2270/11* (2013.01); *F05D 2270/44* (2013.01); *G05B 13/026* (2013.01); *G05B 2219/34477* (2013.01)

(58) Field of Classification Search
CPC .......... G01M 15/02; G08B 2219/37214; F02C 7/30; F05D 2220/32; F05D 2260/821

USPC ............ 340/679; 701/106, 31.6, 31.7; 702/182–184; 73/112.01, 18
See application file for complete search history.

(56) References Cited

U.S. PATENT DOCUMENTS

| | | |
|---|---|---|
| 4,215,412 A | 7/1980 | Bernier et al. |
| 6,312,191 B1 | 11/2001 | Rosenfeld |
| 7,743,599 B2 | 6/2010 | Taware et al. |
| 7,765,873 B2 | 8/2010 | Klosinski |
| 7,853,433 B2 | 12/2010 | He et al. |

(Continued)

FOREIGN PATENT DOCUMENTS

| | | |
|---|---|---|
| WO | 2012009024 A1 | 1/2012 |
| WO | 2013127993 A1 | 9/2013 |

OTHER PUBLICATIONS

"MyFleet Plant Performance Monitoring Solution Empowers Plant Operators to Make Smarter Decisions;"GE; Jun. 8, 2011; http://www.genewsroom.com/Press-Releases/MyFleet-Plant-Performance-Monitoring-Solution-Empowers-Plant-Operators-to-Make-Smarter-Decisions-219685

*Primary Examiner* — Toan N Pham
(74) *Attorney, Agent, or Firm* — Fletcher Yoder, P.C.

(57) ABSTRACT

A control system for a gas turbine includes a processor. The processor configured to access one or more operating parameters of the gas turbine. The operating parameters are configured to specify how the gas turbine operates. The processor is configured to predict a rate of degradation to one or more parts of a compressor of the gas turbine due to one or more effects on the parts by operating the gas turbine according to the one or more operating parameters. The processor is configured to send an alert to an electronic device based at least in part on the rate of degradation of the compressor.

20 Claims, 6 Drawing Sheets

(56) References Cited

U.S. PATENT DOCUMENTS

| | | |
|---|---|---|
| 7,861,544 B2 | 1/2011 | Ferreira et al. |
| 8,000,930 B2 | 8/2011 | Poncet et al. |
| 8,370,046 B2 | 2/2013 | Jiang et al. |
| 8,475,110 B2 | 7/2013 | Hefner et al. |
| 8,762,379 B2 | 6/2014 | Birdwell et al. |
| 8,775,427 B2 | 7/2014 | Birdwell et al. |
| 8,775,428 B2 | 7/2014 | Birdwell et al. |
| 8,825,567 B2 | 9/2014 | Jiang et al. |
| 9,896,960 B2 * | 2/2018 | Ewens ............... F01D 21/003 |
| 2004/0016445 A1 | 1/2004 | Koch et al. |
| 2006/0075683 A1 | 4/2006 | Klein et al. |
| 2008/0250769 A1 | 10/2008 | Wagner et al. |
| 2010/0266742 A1 | 10/2010 | Ferreira et al. |
| 2013/0024179 A1 * | 1/2013 | Mazzaro .............. G06Q 10/04 |
| | | 703/18 |
| 2013/0042642 A1 | 2/2013 | Ferreira et al. |
| 2013/0054213 A1 * | 2/2013 | Rohm, III ............ G05B 17/02 |
| | | 703/7 |
| 2014/0008206 A1 | 1/2014 | Miller et al. |
| 2014/0278241 A1 | 9/2014 | Jiang et al. |
| 2015/0101401 A1 | 4/2015 | Ekanayake et al. |
| 2015/0106059 A1 | 4/2015 | Ekanayake et al. |
| 2016/0342154 A1 * | 11/2016 | Panov ............... G05B 23/0221 |

\* cited by examiner

SYSTEM AND METHOD TO ENHANCE CORROSION TURBINE MONITORING

BACKGROUND

The subject matter disclosed herein relates to turbomachinery, and more particularly, to monitoring turbine performance.

In power generation systems, turbines, such as gas turbines or steam turbines, may convert fuel and air (e.g., an oxidant) into rotational energy. For example, a gas turbine may compress the air, via a compressor, and mix the compressed air with the fuel to form an air-fuel mixture. A combustor of the gas turbine may then combust the air-fuel mixture and use energy from the combustion process to rotate one or more turbine blades, thereby generating rotational energy. The rotational energy may then be converted into electricity, via a generator, to be provided to a power grid, a vehicle, or another load.

Various parts of the turbine, such as the compressor, the combustor, or the one or more turbine blades, may degrade or corrode over time while being exposed to the air fuel mixture or other environmental agents. For instance, the air entering the gas turbine may include dust that enters the compressor. The dust may cause degradation, corrosion, or other damage to the compressor, resulting in unplanned outages or other failures.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In a first embodiment, a control system for a gas turbine includes a processor configured to access one or more operating parameters of the gas turbine, wherein the operating parameters are configured to specify how the gas turbine operates, predict a rate of degradation to one or more parts of a compressor of the gas turbine due to one or more effects on the parts by operating the gas turbine according to the one or more operating parameters, and send an alert to an electronic device based at least in part on the rate of degradation of the compressor.

In a second embodiment, a method includes accessing, via a processor, one or more operating parameters of a gas turbine, predicting, via the processor, a rate of degradation to one or more parts of a compressor of the gas turbine due to the one or more operating parameters, and sending, via the processor, a signal to an electronic device indicating an alert based at least in part on the rate of degradation of the compressor.

In a third embodiment, a non-transitory computer readable medium includes instructions configured to be executed by a processor of a monitoring system, wherein the instructions include instructions configured to cause the processor to access one or more operating parameters of the gas turbine, predict a rate of degradation to one or more parts of a compressor of the gas turbine due to the one or more operating parameters, and send a signal to an electronic device indicating an alert based at least in part on the rate of degradation of the compressor.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
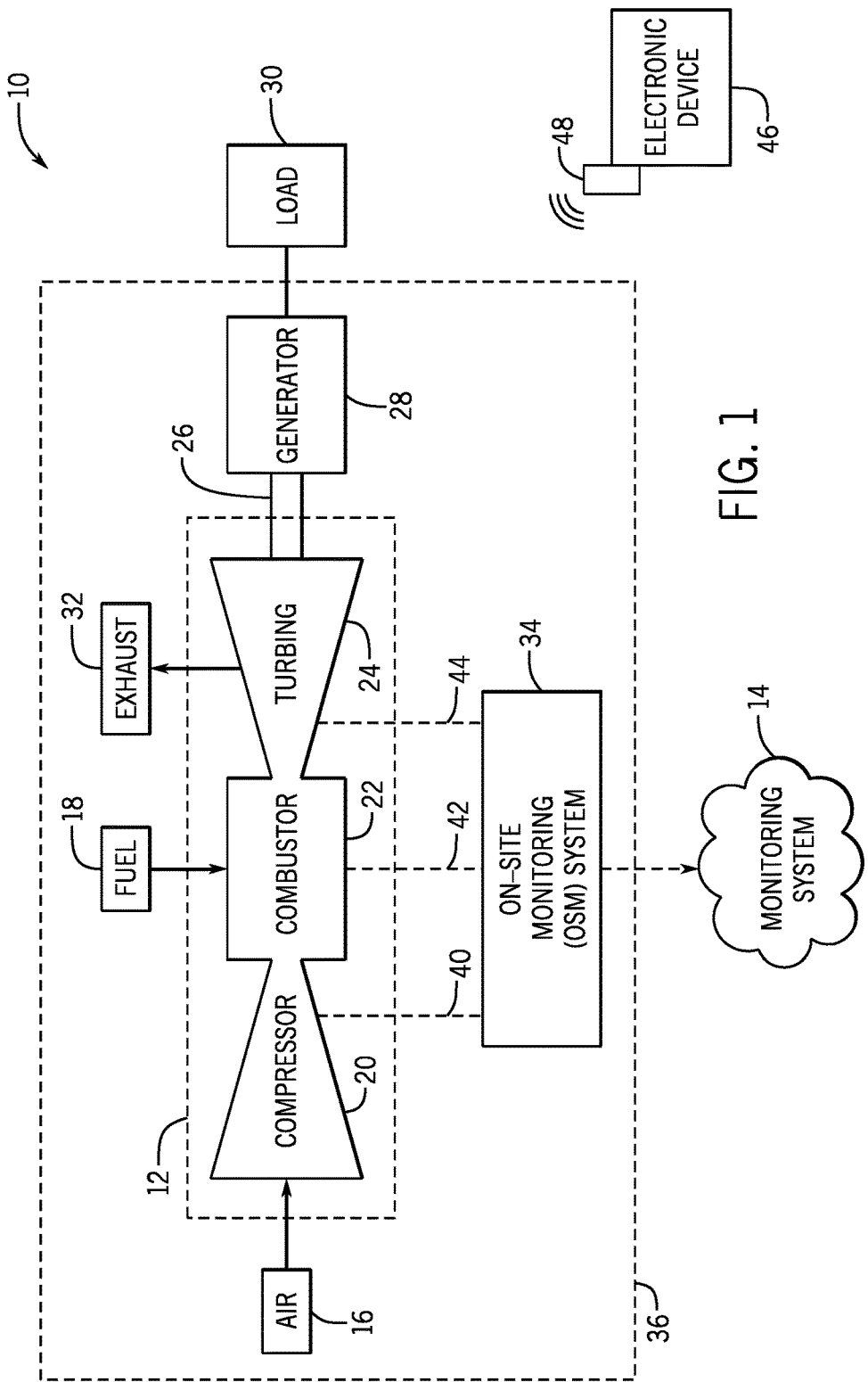
FIG. 1 is a block diagram of a gas turbine system having a monitoring system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are related to monitoring systems for turbomachinery, such as gas turbines, steam turbines, and/or compressors. For example, a gas turbine may include one or more compressors, a combustor, and one or more turbine blades. The one or more compressors may receive air adjacent to the compressor and compress the air to be mixed with a fuel to form an air-fuel mixture. The combustor may then combust the air-fuel mixture and use energy from the combustion process to rotate rotors of the one or more turbines. Further, the one or more turbines may be coupled to a shaft that rotates due to rotation of the one or more turbines. The rotational energy of the shaft may be converted (e.g., via a generator) into electrical energy to provide electricity to one or more loads.

Over time, various parts of the turbine, such as the one or more compressors, the combustor, and/or the turbine blades, may degrade, corrode, or otherwise become damaged, resulting in unplanned outages, reduced efficiency, or failures of the various parts. Degradation, corrosion, or other damage may be caused by a variety of factors, such as the air and fuel used. For example, environmental and/or atmospheric conditions, such as dust, pollen, sulfuric dioxide gas, sulfate aerosols, and/or sea salt aerosols, may impact operation of the various parts of turbomachinery. For instance, a rate of corrosion of a turbine compressor may depend on sulfuric dioxide levels in the air adjacent to the compressor that will be compressed. As another example, as air flows into the compressor, there may be different amounts of dust that can degrade performance of blades of the compressor. As the amount of dust increases, there may be an increased likelihood of compressor fouling. Moreover, due to the atmospheric conditions and/or environmental conditions across a fleet, turbomachinery may degrade, corrode, or otherwise become damaged much faster than expected and cause compressor fouling, bleed valve opening, and/or inlet filter ineffectiveness. To improve operation of the turbine, a monitoring system may be used to monitor the degradation, corrosion, or other damage that occurs to the turbine.

With the foregoing in mind, in certain embodiments, the monitoring system may use environmental data indicative of environmental conditions (e.g., atmospheric and/or environmental conditions) to predict damage to the compressor, combustor, turbine blades, or the like. For example, environmental data indicating atmospheric conditions related to weather may be received by the monitoring system. The monitoring system may then predict an occurrence of an event associated with the gas turbine based on the environmental conditions. The monitoring system may then generate a signal indicating the prediction and may send the signal to some computing device, a database, a communication network, or the like.

By way of introduction, FIG. 1 shows a diagram of a gas turbine system 10 that includes a gas turbine 12 and a monitoring system 14. The gas turbine 12 may receive air 16 or another oxidant, such as oxygen, oxygen-enriched air, or oxygen-reduced air, and a fuel 18. The air 16 may be from outside the gas turbine 12, such as air adjacent to the system 10. That is, the air 16 may include characteristics that correspond to characteristics of surrounding atmospheric and/or environmental conditions. The air 16 may enter one or more compressors 20. While one compressor 20 is shown in FIG. 1 as an example, two, three, or more compressors may be used. For example, a three compressor system may include a low pressure compressor, an intermediate pressure compressor, and a high pressure compressor that are coupled to each other to further compress the air 16 and provide compressed air for the combustion process.

The compressed air and the fuel 18 may be mixed to create an air-fuel mixture to be combusted in a combustor 22. The combusted air-fuel mixture may then apply a force to rotate a rotor of a turbine 24. While one turbine 24 is shown in FIG. 1 as an example, the gas turbine system 10 may include two, three, or more turbines 24. The turbine 24 may be operatively coupled to a shaft 26 that rotates as the rotor of the turbine 24 rotates. The rotational energy of the shaft 26 may then be converted to electricity via a generator 28, to provide electricity to one or more loads 30. Although the gas turbine 12 is described in detail with respect to FIG. 1, it should be borne in mind that it is simply meant to be illustrative as an example. The monitoring system 14 may be used with steam turbines, pumps, or compressors, or any asset suitable for receiving air or fuel with the characteristics of atmospheric and/or environmental systems.

The gas turbine system 10 may also include an on-site monitoring (OSM) system 34 to monitor conditions of the gas turbine 12 at a location 36 by receiving signals 40, 42, and 44 from sensors on the gas turbine 12 indicating operating parameters of the compressor 20, combustor 22, and turbine 24, respectively. For instance, the operating parameters received from the signals 40, 42, and 44 from may be referred to as on-site monitoring (OSM) data and may include ambient conditions, compressor parameters, fuel flow, power output, or the like. The location 36 may be a geographic position, a site, a building, or a structure of where the gas turbine 12 is located. As described in detail below, the OSM data from the OSM system 34 may be sent to the monitoring system 14 that operates on a cloud data server and that uses environmental data.

Certain parts of the gas turbine system 10 may undergo maintenance procedures to increase a lifespan or improve operation of the given parts. For example, to reduce degradation of the compressor 20, the compressor 20 may undergo a water wash, such as an online water wash or an offline water wash. In an online water wash, the gas turbine system 12 may continue to provide power during the water wash. In an offline water wash, the gas turbine system 12 may be disconnected and components may be cleaned. For example, an operator may hand clean the compressor 20 and may reach the first stages while the compressor is online, but be unable to reach pieces that impact operation of the compressor 20 without taking the compressor 20 offline. As such, the offline water wash may be a more thorough cleaning than the online water wash.

The monitoring system 14 and/or the OSM system may send signals to an electronic device 46 that may be located at the location 36 or at another location. For example, the electronic device 46 may be a computer, laptop, smartphone, tablet, or the like. Further, the electronic device 46 may communicate with the monitoring system and/or the OSM system via a transceiver 48, a wired connection (e.g., Ethernet), or routed via a router. For instance, an operator may use the electronic device 46 to see reports, alarms, advisory actions, or visualizations generated by the monitoring system 14 and/or the OSM system 34.

As described in detail below, environmental data may be used to predict rates of degradation of the compressor 20 over time. The predictions may then be used to determine procedures to reduce degradation of parts of the gas turbine system 12. For instance, predicted degradation of the gas turbine 12 may be used to determine times for scheduling water washes that reduce outages caused by degradation and increase the lifespan of the compressor.

Figure 2:
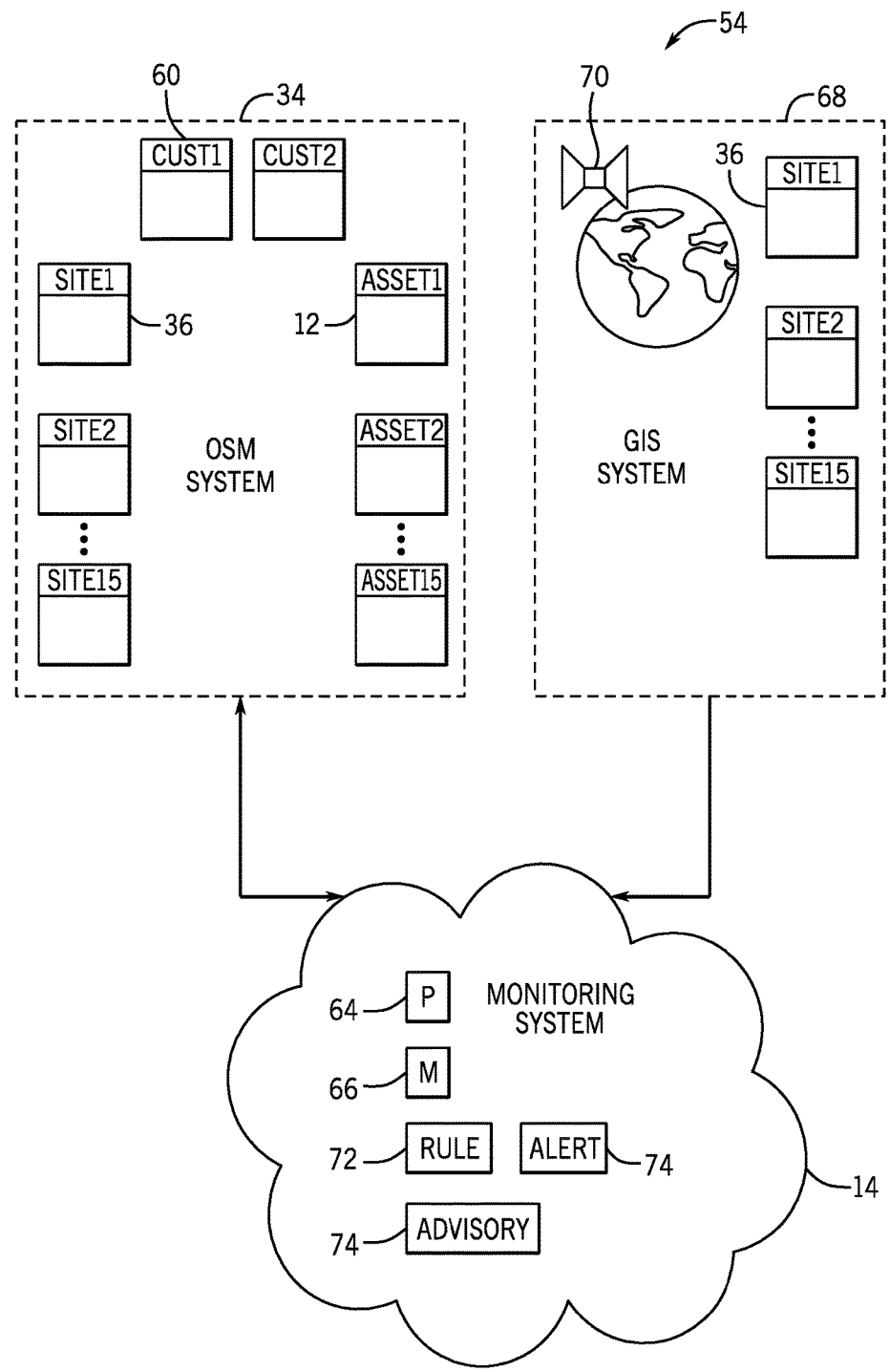
FIG. 2 is a block diagram of an architecture of the monitoring system of FIG. 1, in accordance with an embodiment.

FIG. 2 shows a block diagram of the various data received and/or sent by the monitoring system 14 on a cloud data server. The monitoring system 14 may receive data from the OSM system 34 described with respect to FIG. 1. The OSM systems 34 may be located at one or more locations 36 and may be associated with one or more assets 12. Further, multiple OSM systems 34 may provide the monitoring system 14 with fleet data related to each location 36 and asset 12 as well as data related to the customer 60.

The monitoring system 14 may be a cloud-based system that receives and/or sends signals to the gas turbine system 10 indicating one or more alerts related to environmental data. The monitoring system 14 may include a processor 64 and memory 66. The OSM system 34, the electronic device 46, and/or the environmental system 68 may each include similar hardware (e.g., processor and memory) as described below with respect to the monitoring system 14. Further, the processor 64 will be used throughout this disclosure, although as one of ordinary skill in the art will appreciate, multiple processors may be used by the monitoring system 14, for example, across a cloud platform. The processor 64 may be operatively coupled to the memory 66 to execute instructions for carrying out the presently disclosed techniques. These instructions may be encoded in programs or code stored in a tangible non-transitory computer-readable medium, such as the memory 66 and/or other storage. The processor 64 may be a general purpose processor (e.g., processor of a desktop/laptop computer), system-on-chip (SoC) device, or application-specific integrated circuit, or some other processor configuration. The memory 66, in the embodiment, includes a computer readable medium, such as, without limitation, a hard disk drive, a solid state drive, diskette, flash drive, a compact disc, a digital video disc, random access memory (RAM), and/or any suitable storage device that enables the processor 64 to store, retrieve, and/or execute instructions and/or data. The memory 66 may include one or more local and/or remote storage devices.

The processor 64 may obtain environmental data from a global environmental database (e.g., environmental system 68). The environmental system 68 may provide environmental data that corresponds to the one or more locations 36 of the gas turbine systems 10. For example, if a gas turbine system 10 is located in a city, state, province, region, country, or the like, then the monitoring system 14 may receive environmental data for that city, state, province, region, or country.

As mentioned briefly above, the processor 64 may obtain environmental data that includes atmospheric conditions related to weather tracked globally. For example, the processor 64 may receive indications of levels of sulfur dioxide ($SO_2$), sulfate aerosols, sea salt aerosols, atmospheric particulate matter with a diameter less than 2.5 micrometers ($PM_{2.5}$), humidity, temperature, or the like. Further, the processor 64 may determine predictions from levels of the atmospheric conditions by constructing models based on prior effects of the atmospheric conditions. The processor 64 may then determine one or more rules for improving lifespan of parts of the gas turbine system 10.

The monitoring system 14 may determine a prediction based on received data, such as the environmental data, OSM data, or both. As described in detail below, the monitoring system 14 may determine the prediction by developing one or more models and/or performing one or more algorithms based on atmospheric conditions and previously received OSM data. Further, the processor 64 may then apply one or more rules 72 to the OSM data and, if a rule 72 is violated, escalate the violated rule 72 by generating an alert 74 or advisory information 76, such as recommendations for corrective actions.

The one or more rules 72 may be thresholds that are established from prior data, calculations, or the like. For example, the rules may capture OSM data over time and establish baseline reference values (R) for power output, heat rate, efficiency, or the like. For example, over weeks, months, or years, and/or based on design information of a gas turbine 12, the processor 64 may establish that the gas turbine 12 has an efficiency with a baseline reference value of 41%. In an embodiment, the processor 64 establishes, via MATLAB®, for example, the rules from the OSM data by performing statistical analysis of the OSM data. For instance, the processor 64 may determine that operating beyond one standard deviation from the baseline reference indicates that it is desirable for an operator to perform an offline water wash. For example, if efficiency decreases below 1%, 5%, 10%, 15% of the baseline reference value, the rule may be violated. The processor 64 may establish rules 72 based on a difference between the reference value and measurements (P) (e.g., |R−P|). As another example, the processor 64 may establish rules based on a relative difference between the reference value and the measurements (e.g., |R−P|/R). As yet another example, with respect to compressor, the processor 64 may establish rules 72 based on a slope (e.g., |R−P|/time since last online or offline water wash).

Figure 3:
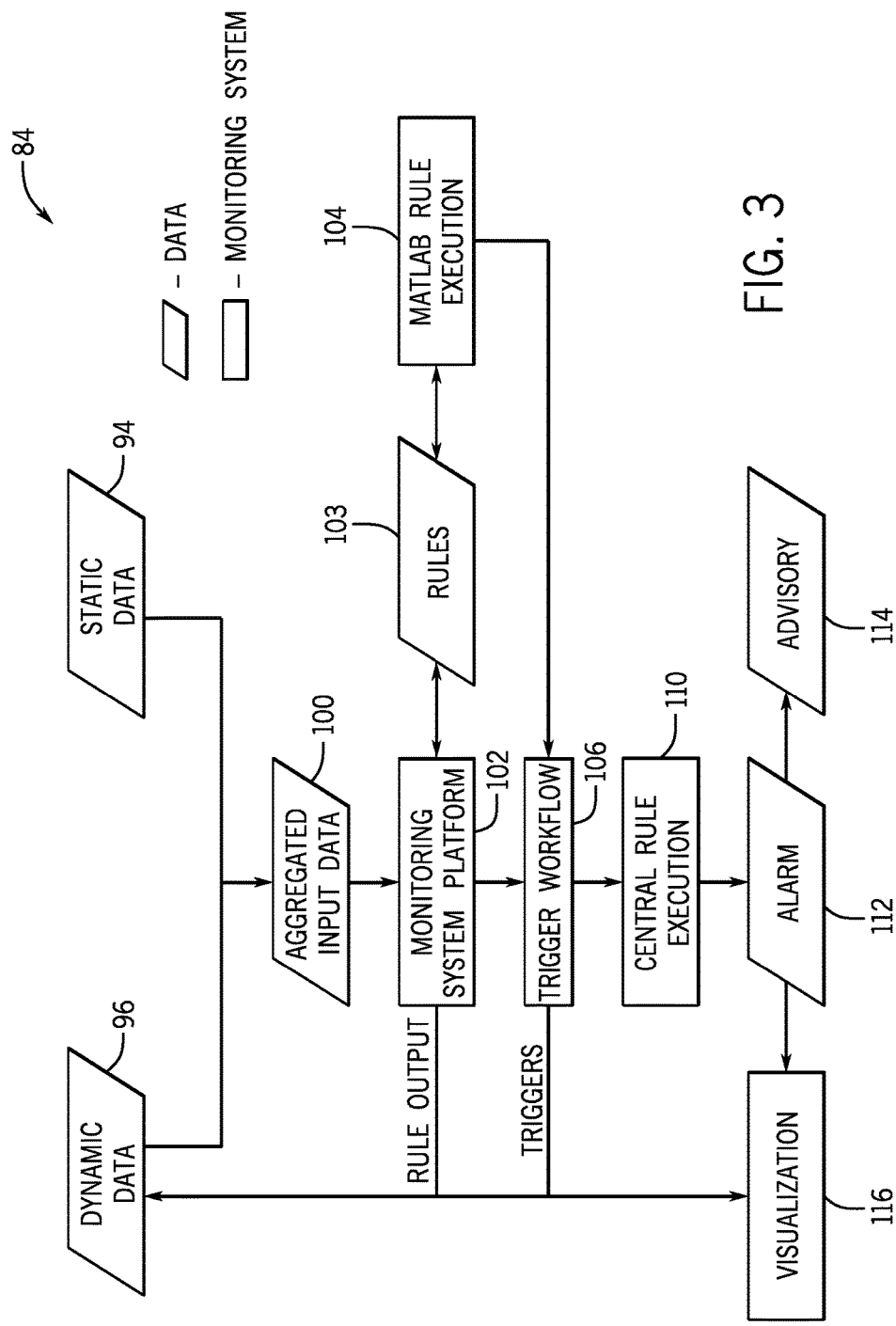
FIG. 3 is a flow diagram of a method performed by the monitoring system of FIG. 1, in accordance with an embodiment.

FIG. 3 is a data flow diagram of a process 84 performed by the monitoring system 14 of the gas turbine system 10. The process 84 begins by receiving static data 94, such as asset configuration data (e.g., type of one or more parts of the turbine, location 36 of the turbine, and/or fleet data), environmental data from the environmental system 68, or the like. For example, the static data 94 may include prior performance data of the gas turbine system 10, international standard organization (ISO) conditions, design conditions, and/or certain accessories available for the gas turbine system 10. Further, the static data 94 may include correction curves, periodic testing data, baseline reference data, rated conditions, fleet degradation curves, cycle deck configurations, or the like. The static data 94 may be located on a server on the environmental system 68 and/or the OSM system 34.

The processor 64 may also receive dynamic data 96, such as OSM data indicating performance and/or efficiency of the compressor 20, the combustor 22, and/or the turbine 24, from a central dynamic database 98. Dynamic data 96 may include ambient conditions (e.g., temperature, pressure, humidity), efficiency (e.g., power generated for a given amount of fuel and/or air), inlet system conditions (e.g., temperature, pressure, bleed), compressor parameters (e.g., pressure flow), fuel flow and power output, and/or steam injection conditions located on the OSM system 34. As shown in FIG. 2, in one embodiment, the central database of the OSM system 34 may be stored separately from the monitoring system 14.

The processor 64 may aggregate the received static data 94 and dynamic data 96 as input data 100. The monitoring system platform 102 may then, via the processor 64, obtain the aggregated input data 100 and evaluate the gas turbine system 10 by determining a prediction based on the input data 100 and/or by evaluating performance degradation of the gas turbine system 10, as described with respect to FIG. 4 below. The processor 64 may then determine one or more rules 103 based on the prediction and compare the dynamic data 96 to the one or more rules. For instance, using a MATLAB® execution system 104 that identifies correlations between types of the aggregated data, the processor 64 may determine whether any rules have been violated. For example, the processor 64 may determine, via the MATLAB® rule execution system 104, that dust in the atmosphere is correlated to an increased likelihood of compressor fouling. As such, the processor 64 may establish thresholds related to times between water washes based on dust level in the atmosphere during prior events of compressor fouling.

The processor 64 may obtain a trigger 106, or dynamic data 96 that exceeds the thresholds of the one or more rules 103. The triggers 106 may include environmental input data, degradation levels since the most recent water wash, and/or degradation levels with respect to a baseline value established from models and/or algorithms. Additional and/or alternatively, the triggers 106 may be received from the Matlab rule execution system 104. The processor 64 may utilize the triggers 106 to determine the rules 103 to escalate 110 when rules 103 are violated. For instance, the processor 64 may generate an alarm 112, provide advisory information 114, or otherwise inform an operator of the violated rule 103.

The triggers 106 (e.g., operating parameters of the gas turbine 12 that violate the rules 103) and/or the rules 103 may be stored as dynamic data 96 on the OSM system 34. Alternatively and/or additionally, the rules 103 may be provided as a visualization 116 to the operator. For example, the processor 64 may generate reports related to fleet comparisons, event statistics, input trends, output trends, and/or environmental factors. The visualization 116 may include the triggers 106, the rules 103, and the dynamic data 96 used in the comparisons, and the visualization 116 may be stored with the dynamic data 96.

In certain embodiments, the processor 64 may send a signal to the OSM system 34 to control operation of the gas turbine system 10 based on the predicted event. For example, the processor 64 may send a signal to shut down the gas turbine, to adjust fuel flow, to adjust the air/fuel ratio, or the like. That is, the processor 64 may control the gas turbine system 10 based on the alarm 112. In some embodiments, the processor 64 may send the alarm 112 to the electronic device 46 cause the electronic device to activate and display an application that provides the alarm 112, the advisory information 114, or any combination thereof, to an operator to control operation of the gas turbine system 10.

Figure 4:
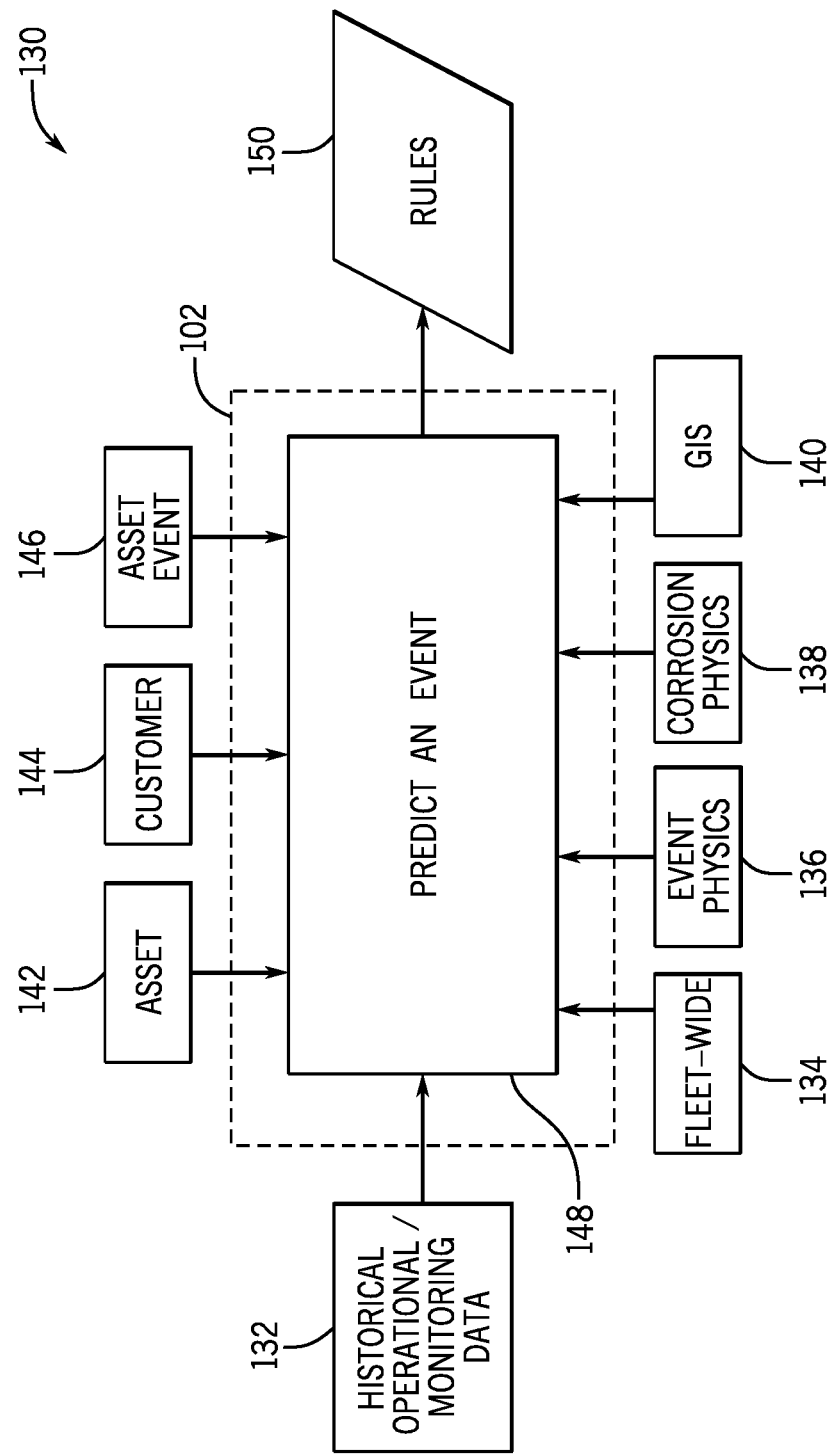
FIG. 4 is a flow diagram of a method to determine rules based on a predicted event of the gas turbine system of FIG. 1, in accordance with an embodiment.

FIG. 4 is a data flow diagram showing a process 130 performed by the processor 64 of the monitoring system platform 102 to predict an event based on the dynamic data 96 and/or the static data 94. An event can be any hardware failure (e.g., compressor blade crack, material loss, rotor crack, turbine blade crack or material loss), compressor fouling, inlet filter clogging, or any efficiency degradation of a component (compressor, turbine, or combustor). The event may be a forced outage or maintenance departure due to an anomaly in the system operation. For example, events may include performance of operating parameters of the gas turbine system 12 exceeding or falling below thresholds, such as degradation levels and/or corrosion levels exceeding a certain threshold since the last water wash, percent lower explosive limit (% LEL) of alcohol in the compressor falling below a threshold, or a calculated percent degradation and corrosion falling below a threshold. As another example, events may include compressor fouling, power outages, faults, compressor blade cracks, or the like.

The processor 64 may receive historical operational/monitoring data at block 132, such as OSM data prior to the occurrence of an event. Further, the processor 64 may receive fleet-wide data at block 134 related to operation of multiple assets across multiple sites. The fleet-wide data may include OSM data from other locations 36. As an example, fleetwide data may include average efficiency levels of a set of engines at various times. At block 136, the processor 64 may receive event physics data that is data used in calculations based on the physics of the gas turbine system 10. For instance, event physics data may include the thermodynamic modeling variables (e.g., turbine inlet pressure, stage one nozzle throat area, etc.) described below with respect to FIG. 6. The processor 64 may receive corrosion physics data, at block 138, which is data related to calculating corrosion of the compressor 20. For example, corrosion physics data may include a number of fired hours that the compressor has operated and that is used to calculate degradation. At block 140, the processor 64 may receive the environmental data, such as the atmospheric conditions, as described above.

At block 142, the processor 64 may receive asset maintenance data of actions taken by an operator to maintain operation of the gas turbine system 10. Asset maintenance data may include data related to an operator performing a cleaning, water wash, testing, or the like. At block 144, the processor 64 may receive customer configuration data of how the customer 60 associated with the asset has configured the gas turbine system 12 for operation. For example, the customer configuration data may include types of combustors or turbines used, a frequency in which the turbine is operating, types of fuel 18 used by the gas turbine system 10, or the like. Further, the processor 64 may receive asset event data at block 146 of various prior events that are related to the gas turbine system 10. For example, asset event data may include data related to degradation levels when compressor fouling has occurred previously, efficiency of the gas turbine system 10 prior when the last outage occurred, or the like.

Figure 6:
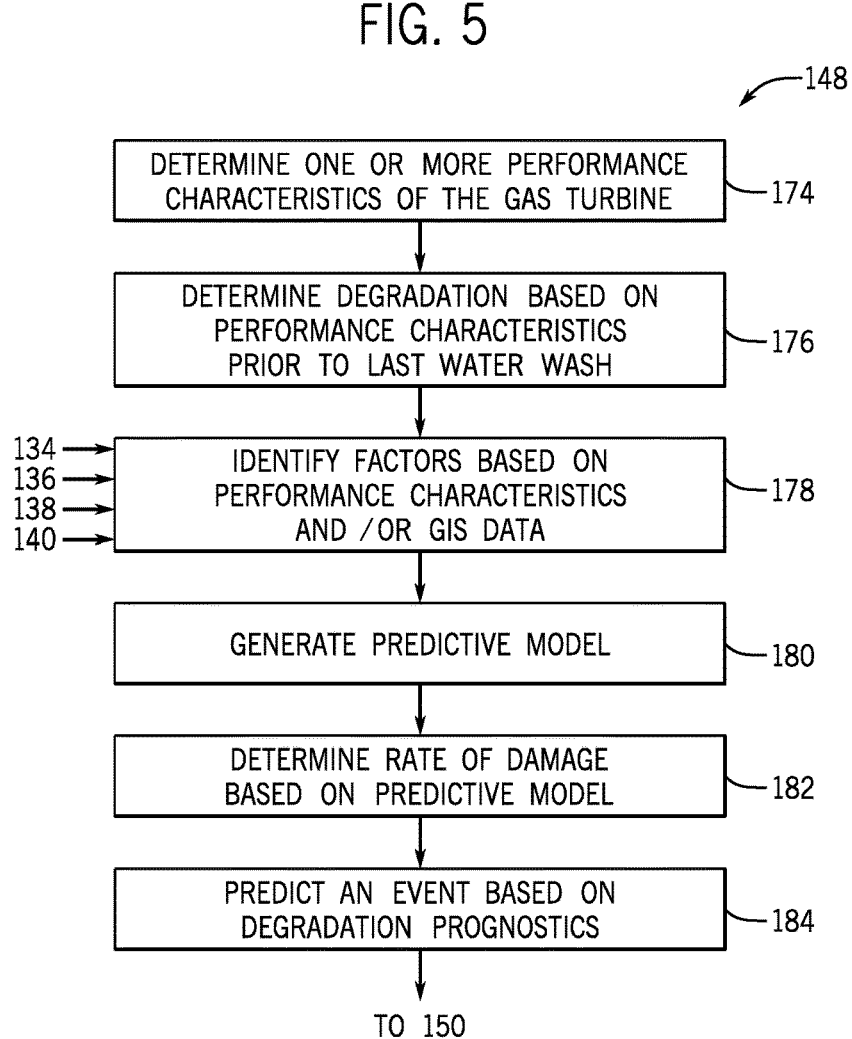
FIG. 6 is a flow diagram of a method performed by the monitoring system to predict the event of FIG. 4, in accordance with an embodiment.

As described in detail with respect to FIG. 6, the processor 64 may then predict the event, at block 148, based on the historical data, fleet wide data, event physics data, corrosion physics data, environmental data, asset data, customer data, and/or asset data and data of the asset. For example, the processor 64 may predict when the next compressor fouling will occur based on the current degradation levels and environmental data that corresponds to rates that the current degradation levels may increase. As another example, the processor 64 may predict lube oil leakage of the gas turbine 12 based on when maintenance of compressor 20 was last performed. As yet another example, the processor 64 may predict when water quality or fuel quality entering the combustor 22 will fall below a threshold level based on environmental data that impacts the water and/or fuel system at the location 36. At block 150, the processor 64 may then determine one or more rules based on the prediction.

Figure 5:
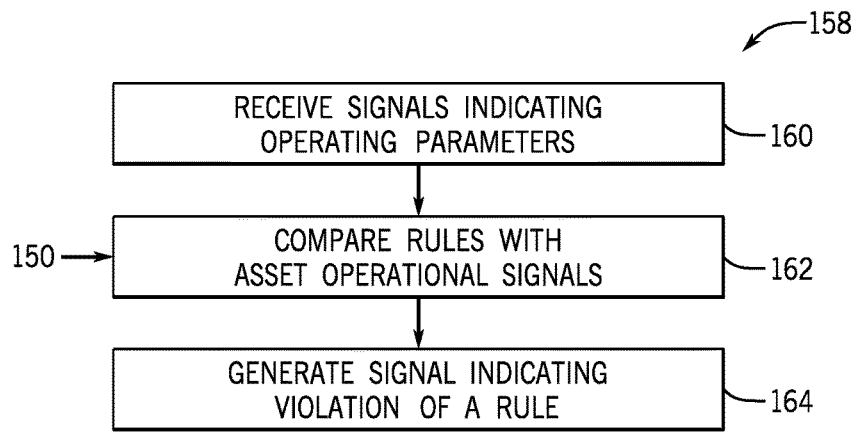
FIG. 5 is a flow diagram of a method performed by the monitoring system of FIG. 1 to generate a signal based on a comparison of the rules of FIG. 4 with operating parameters of the gas turbine system of FIG. 1, in accordance with an embodiment.

FIG. 5 illustrates a flow diagram of a method 158 performed by the processor 64. At block 160, the processor 64 may receive signals indicating operating parameters of the gas turbine system 10 from the OSM system 34 in real-time or otherwise received at an interval (e.g., from the last second, minute, five minutes, ten minutes, hour, etc.). The received operating parameters include ambient temperature, humidity, pressure, power output, fuel temperature, fuel flow, power output, turbine shaft speed, compressor inlet and exhaust pressure drop, or the like. At block 162, the processor 64 may compare the received operating parameters to the one or more rules 150, determined as described above, to determine whether any rules were violated. For example, the comparisons may include whether differences, relative differences, or slopes between reference values (R) and measured values (P) exceed a threshold.

At block 164, the processor 64 may generate a signal indicating various results, such as violations of the rules. As another example, the prediction results may include ranked predictions based on a likelihood of the prediction, an urgency of the predictions, or both to enable an operator to prioritize maintenance to the gas turbine system 10. Alternatively and/or additionally, the results may include one or more alerts 112 of events that are likely to occur, such as a message to an on-site operator, a message sent to the OSM system 34, or the like.

Further, the processor 64 may send one or more advisory information 114 that indicate paths an operator may take to improve performance of the gas turbine system 10. The advisory information 114 may include times for performing offline compressor water washes, maintenance actions, sensor calibrations, maintenance schedules, hardware upgrades, design improvements, or the like. For example, the advisory information 114 may indicate water wash ineffectiveness, water quality, fuel quality, air quality, dust levels, lube oil leakage, secondary flow leakage, or compressor fouling. If diagnostics show that the continuously monitored degradation rate is attributed to the lack of compressor washes, filter cleanings, or open bleed valves, the processor 64 may advise maintenance earlier than originally planned to ensure that the gas turbine system 10 operates efficiently. That is, the advisory information 114 may enable an operator to improve lifespan of the compressor 20 by providing data related to when and what type of water wash is desirable. The prediction results may further include one or more visualizations, such as charts, graphs, or lists of performance of efficiency of the engine over time as compared to operation of the combustor 20.

The processor 64 may send a signal indicating the event, the violation of the rule, the advisory action, reports, visualizations, or the like. For example, the processor 64 may communicate the occurrence of the event to the electronic device 46 via email, phone, or web services. The site engineers may then access the emails, phone, or web services to inspect the event, the rules, the advisory actions, reports, visualizations, or the like. For example, an indication of predicted compressor fouling may be sent to the electronic device 46 for the operator to perform an offline water wash.

FIG. 6 is a block diagram of a process performed by the processor 64 to predict the event of block 148 of FIG. 4. At block 174, the processor 64 may first determine one or more performance characteristics of the gas turbine via an algorithm and/or model. For example, using a thermodynamic modeling approach, the processor 64 may calculate turbine performance, via thermodynamic cycle matching, from a set of measured parameters, such as a compressor discharge temperature and pressure, exhaust temperature, fuel flow, and power output. That is, thermodynamic cycle matching may be used to determine non-measured performance parameters, such as compressor and turbine efficiencies, combustor exit temperature, and turbine firing temperature, for the gas turbine operated at specified conditions. For instance, the thermodynamic modeling approach may calculate turbine mass flow rate using the following equation:

$$f_{gt} = g_{air} \times P_{in} \times A_{S1N} \times \alpha_f \sqrt{T_{in}} \qquad \text{eq. (1)}$$

where $f_{gt}$ is turbine mass flow rate, $g_{air}$ is a flow calculation function, $P_{in}$ is turbine inlet pressure, $A_{S1N}$ is a stage one nozzle throat area, and $\alpha_f$ is a stage one nozzle flow coefficient, and $T_{in}$ is the turbine total inlet temp.

The compressor mass flow rate ($f_{comp}$) follows the law of conservation of mass using the following equation:

$$f_{comp} = f_{gt} + f_{ext} - f_{fuel} \qquad \text{eq. (2)}$$

where $f_{ext}$ is extraction flow and $f_{fuel}$ is fuel flow. The compressor and turbine power values may then be calculated via the thermodynamic heat balance with the law of conservation of mass. The gas turbine model is then used to project performance of the gas turbine system 10 under other operating conditions, such as under forecasted weather predictions at the location 36. Further, the one or more performance characteristics of the gas turbine system 10 may then be calculated and corrected, via the thermodynamic cycle matching method, at baseload and ISO conditions.

The model may be integrated into the monitoring system 14 to track in real-time a trend of asset performance in terms of performance indicators (output, heat rate, flow, and efficiency). Corrective action will be recommended to the customer once an anomaly or significant degradation is detected, in order to improve the performance of the system going forward. The model may be used to troubleshoot the performance issues that the customer is concerned about, such as inlet filter clogging, bleed valve open, or any operation issue. Additionally and/or alternatively, the model may be used to conduct performance scenarios analysis to help upgrade the hardware parts so the system 10 can be operated at optimal performance, for instance, to upgrade a hot gas path, compressor 20, or combustor 22.

At block 176, the processor 64 may determine degradation, corrosion, or other damage values of the gas turbine system 10 based on the performance characteristics of block 174. Further, the degradation of the compressor 20 may be calculated with respect to the last offline water wash based on the compressor mass flow rate, as described above. The degradation may be based on generator watts, power factor, ambient conditions, fired hours, fuel system, compressor discharge pressure, discharge temperature, turbine pressure, exhaust temperature, or the like.

At block 178, the processor 64 may then determine operating factors based on the performance characteristics, the degradation values, or other inputs (e.g., fleet-wide data, event physics, corrosion physics, environmental data, asset management configuration data, customer data, or asset event data). The operating factors may be factors that may be helpful in assessing whether the gas turbine system 10 performance is operating as desired. For example, compressor degradation may have different correlation coefficients for different performance characteristics. That is, degradation of the compressor may be found to have a stronger correlation to $SO_2$ than surface pressure. As such, degradation may be determined by weighing the performance characteristics with a greater correlation coefficient, $SO_2$, more heavily than the performance characteristics with a lower correlation coefficient, surface pressure.

The processor 64 may select operating factors that are relatively independent of one another, such as time averaged surface pressure, humidity, temperature, dust, sea salt, sulfur dioxide, gas fuel flow, inlet air flow, and generator frequency. For example, turbine HP shaft speed falling within the range of 95% to 105% may be used to determine whether the unit is operating within desired operation and may therefore be an operating factor, and time averaged surface pressure may be selected as another operating factor because it is relatively independent of the shaft speed. Identifying factors may further include combining the identified factors using principal component analysis to weight the factors based on variance between the values of the factors.

At block 180, the processor 64 may then generate a predictive model based on the performance data, OSM data, degradation data, environmental data, and/or critical factors by using the acquired data with known mathematical models, such as a physics-based model, an artificial neural network (ANN), deep learning, random forest, logistic regression, linear predictive modeling, or the like. Further, the model may be constructed as a function (e.g., linear) of the operating factors described with respect to block 178. In some embodiments, the processor 64 may generate the predictive model by determining when current operating parameters will correspond to historical operating parameters associated with the similar events. For example, the processor 64 may establish a relationship between the operating parameters and prior events (e.g., log based, linear, quadratic, etc.). For instance, degradation of the compressor may historically follow a log-based relationship with respect to fired hours. Further, for environmental data, the processor 64 may utilize a general log-linear (GLL) relationship model with a Weibull distribution that reduces a number of variables of the acquired data.

At block 182, the processor 64 may then predict a rate of damage based on the model. That is, the predictive model may be used to determine the rate (e.g., slope) of damage due to corrosion, a rate of power degradation, a rate of deterioration, a rate of change of a likelihood of corrosion causing unplanned outages, a rate of compressor fouling, or the like. For example, over time, blades of the compressor may have an increased tendency to crack when the compressor has a certain level of deterioration. The processor 64 may use historical data of other cracks in other compressors to generate the predictive model and determine a slope that the deterioration is likely to occur by fitting a curve to the predicted values of the predictive model at various points in time.

At block 184, the processor 64 may then compare the predicted rate of damage with the dynamic data to determine performance degradation of the compressor 20. For example, the dynamic data may include historical data, near real-time data, or forecasts (e.g., weather forecasts) of atmospheric and/or environmental data on airborne particulates, trace gas, unit configuration, event history, and/or operational parameters. The dynamic data may be included in the model to determine damage rates. For example, the processor 64 may determine, via the model and the dynamic data, current or future operational damage rates, probability and severity of fouling, probability and severity of corrosion, and/or unplanned outages. Further, the processor 64 may use current operating parameters as points. As such, in some embodiments, the processor 64 may then predict events based on the current operating parameters of the gas turbine system 10 (e.g., current operating point), the rate of damage, and the relationship. For example, the predictive model may be based on historical performance data, the rate of damage, and the dynamic data predict a degradation level at a given point in time. The processor 64 may then compare the degradation level at the given point of time to the rules as described in block 150 above and determine if any advisory information 114 is desired.

Figure 7:
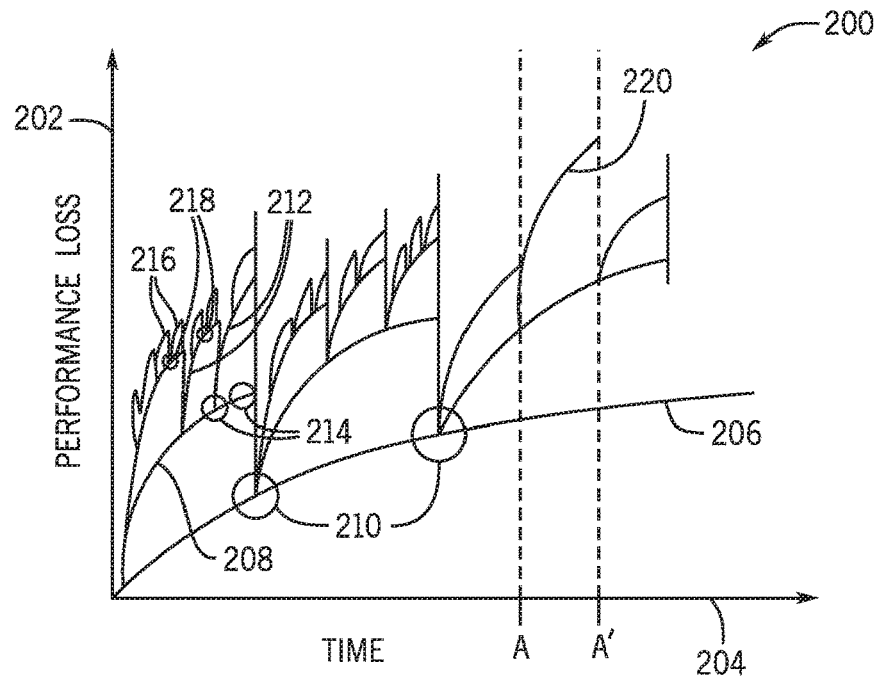
FIG. 7 is a graph of data received by the monitoring system to monitor degradation of a compressor of the gas turbine system of FIG. 1, in accordance with an embodiment.
Figure 8:
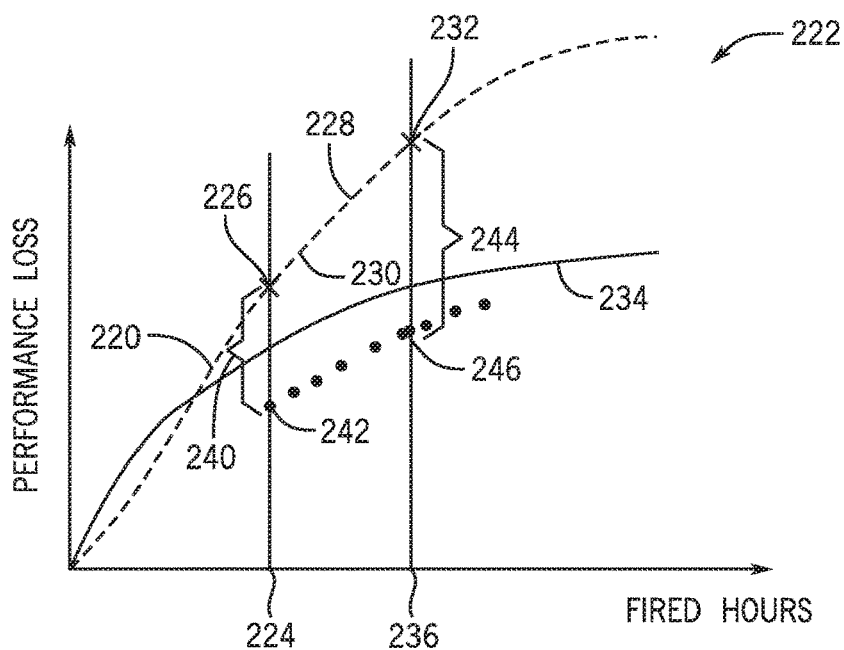
FIG. 8 is a graph of data received by the monitoring system that predicted the event, in accordance with an embodiment.

FIG. 7 shows a graph 200 of performance losses 202 with respect to time 204 of the compressor 20 as an example of the process performed in block 148. As shown in the graph 200, a line 206 represents non-recoverable performance losses of the turbine where the performance of the compressor 20 is permanently reduced. Further, a line 208 represents performance degradation that is recoverable between inspections at points 210 of the compressor 20. That is, at inspections, performance losses of the compressor 20 are minimized to the non-recoverable performance losses. Line 212 represents degradation between offline water washes at points 214, and line 216 represents degradation between online water washes at points 218. As shown in FIG. 8, degradation generally increases over time. As described above, the processor 64 may determine a rate of damage, such as the rates of degradation shown in FIG. 7. For example, depending on dust levels, the compressor may have more rapid degradation as shown by line 220.

FIG. 8 is a zoomed view 222 of the degradation shown by line 220 of the graph 220 of FIG. 7 taken along lines A-A'. At a time 224 having a currently monitored status 226, the processor 64 performs the process described with respect to FIG. 6 and determines degradation levels based on performance characteristics of the gas turbine system 10. The processor 64 then generates a predictive model 228 (the values after the currently monitored status 226 to project the degradation levels in the future (e.g., upcoming hours). The processor 64 may determine the rate of degradation 230 based on the predicted model 228. The processor 64 may then predict an event 232 (e.g., in the future upcoming hours) based on the rate of degradation 230 and/or the predictive model 228. For example, the event 232 may be a predicted power outage or a point where performance loss exceeds a threshold 233 above a desired reference 234.

The processor 64 may generate a signal indicating that a water wash may be used to improve operation of the gas turbine 12. Depending on the severity, the processor 64 may send a signal indicating that the water wash be an online water wash where the compressor 20 is cleaned while the gas turbine 12 is still in operation, an offline water wash where the compressor is cleaned while the gas turbine 12 is offline, or an inspection where losses are minimized to non-recoverable performance losses. To avoid a potential power outage at time 236, the operator may perform an offline water wash earlier than originally schedule. In some embodiments, the processor 64 may send a signal to the OSM system 34 indicating a predicted fouling of the compressor based on previous fouling of one or more other compressors at one or more other locations. For example, the processor 64 may send a signal indicating an alert having advisory information to perform an offline water wash when components within the compressor likely have degradation based on the one or more parameters. Further, at time 224, the water wash may reduce performance losses by a certain margin 240. That is, the processor 64 may send a signal for an operator to perform a water wash when operating at the currently monitored status 226 so that the compressor operates at an operating point 242 where performance losses are reduced. By reducing performance losses based on the predicted event 232 and the rate of degradation, the processor 64 enables the compressor 20 to avoid operating at an operating point 232 before there is an increased likelihood of fouling (e.g., at the predicted event 232). In an embodiment, the processor 64 enables the compressor 20 to operate at an operating point 246 having a margin 244 below where the compressor 20 is predicted to foul at the predicted event 232, thereby decreasing a likelihood of an outage.

Technical effects of the present disclosure include improved operation of a turbine and/or generating signals of alerts based on turbine performance. The system may include a processor that receives environmental data indicating atmospheric conditions of a location. The processor may predict one or more events based on the atmospheric conditions and output signals indicating an alert or advisory actions. The processor may send the output signals to an on-site monitoring system so that the alerts or advisory actions may be used to control operation of the turbine. By monitoring the gas turbine system in real time and notifying the operator, the processor may provide a post-solution activity in alerting the operator and/or controlling operation of the turbine based on predicted events and/or alerts.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system for a gas turbine, comprising:
a processor configured to:
    access one or more operating parameters of the gas turbine, wherein the one or more operating parameters are configured to specify how the gas turbine operates;
    receive environmental data related to a weather forecast for a location associated with the gas turbine;
    determine one or more performance characteristics of the gas turbine based on a thermodynamic model associated with the gas turbine, the one or more operating parameters, the environmental data, and a set of measured parameters, wherein the set of measured parameters comprise discharge temperature of a compressor of the gas turbine, a discharge pressure of the compressor, an exhaust temperature of the gas turbine, a fuel flow of the gas turbine, a power output of the gas turbine, or any combination thereof;
    predict a rate of degradation to one or more parts of the compressor of the gas turbine due to one or more effects on the one or more parts by operating the gas turbine according to the one or more operating parameters with respect to the weather forecast; and
    send an alert to an electronic device based at least in part on the rate of degradation of the one or more parts of the compressor.

2. The control system of claim 1, wherein the processor is configured to construct a predictive model configured to predict one or more degradation values over time to predict the rate of degradation to the one or more parts of the compressor at future times.

3. The control system of claim 2, wherein the processor is configured to receive the one or more operating parameters from one or more sensors on the gas turbine from an on-site monitoring system at a location of the gas turbine.

4. The control system of claim 1, wherein the environmental data is related to one or more atmospheric conditions associated with weather tracked globally.

5. The control system of claim 1, wherein the processor is configured to predict the rate of degradation to one or more blades of the compressor due to the one or more operating parameters.

6. The control system of claim 1, wherein the processor is configured to predict a compressor fouling event related to operation of the compressor based on the rate of degradation.

7. The control system of claim 1, wherein the processor is configured to determine a probability of fouling for the compressor at a future point in time based on the rate of degradation.

8. The control system of claim 1, wherein the alert is configured to indicate to perform a water wash of the compressor to reduce a probability of the compressor fouling based on the rate of degradation.

9. The control system of claim 8, wherein the processor is configured to send a signal to perform a water wash at a time prior to a scheduled water wash based on the alert.

10. A method, comprising:
    accessing, via a processor, one or more operating parameters of a gas turbine;
    receiving, via the processor, environmental data related to a weather forecast for a location associated with the gas turbine, wherein the weather forecast comprises an indication of a first level of sulfur dioxide ($SO_2$), a second level of sulfate aerosols, a third level of sea salt aerosols, a fourth level of atmospheric particulate matter with a diameter less than 2.5 micrometers ($PM_{2.5}$), or any combination thereof;
    determining, via the processor, one or more performance characteristics of the gas turbine based on a thermodynamic model associated with the gas turbine, the one or more operating parameters, the environmental data, and a set of measured parameters, wherein the set of measured parameters comprise discharge temperature of a compressor of the gas turbine, a discharge pressure of the compressor, an exhaust temperature of the gas turbine, a fuel flow of the gas turbine, a power output of the gas turbine, or any combination thereof;
    predicting, via the processor, a rate of degradation to one or more parts of the compressor of the gas turbine due to one or more effects on the one or more parts by operating the gas turbine according to the one or more operating parameters; and
    sending, via the processor, a signal to an electronic device indicating an alert based at least in part on the rate of degradation of the one or more parts of the compressor.

11. The method of claim 10, wherein the environmental data comprises data related to atmospheric conditions.

12. The method of claim 11, wherein the environmental data comprises humidity, temperature, or any combination thereof in air surrounding the gas turbine.

13. The method of claim 10, comprising predicting an event related to operation of the compressor based on the rate of degradation.

14. The method of claim 10, comprising constructing a predictive model that predicts degradation values over time to predict the rate of degradation to the one or more parts of the compressor.

15. A non-transitory computer readable medium comprising instructions configured to be executed by a processor of a monitoring system, wherein the instructions comprise instructions configured to cause the processor to:
    access one or more operating parameters of a gas turbine;
    receive environmental data related to a weather forecast for a location associated with the gas turbine, wherein the weather forecast comprises at least two of a first level of sulfur dioxide ($SO_2$), a second level of sulfate aerosols, a third level of sea salt aerosols, or a fourth level of atmospheric particulate matter with a diameter less than 2.5 micrometers ($PM_{2.5}$);
    determine one or more performance characteristics of the gas turbine based on a thermodynamic model associated with the gas turbine, the one or more operating parameters, the environmental data, and a set of measured parameters, wherein the set of measured parameters comprise discharge temperature of a compressor of the gas turbine, a discharge pressure of the compressor, an exhaust temperature of the gas turbine, a fuel flow of the gas turbine, a power output of the gas turbine, or any combination thereof;

predict a rate of degradation to one or more parts of the compressor of the gas turbine due to one or more effects on the one or more parts by operating the gas turbine according to the one or more operating parameters; and send a signal to an electronic device indicating an alert based at least in part on the rate of degradation of the one or more parts of the compressor.

16. The non-transitory computer readable medium of claim 15, comprising instructions configured to cause the processor to construct a predictive model that predicts degradation values over time to predict the rate of degradation to the one or more parts of the compressor.

17. The non-transitory computer readable medium of claim 16, comprising instructions configured to cause the processor to predict fouling of the compressor based on previous fouling of one or more other compressors at one or more other locations.

18. The non-transitory computer readable medium of claim 15, comprising instructions configured to cause the processor to predict the rate of degradation to blades of the compressor that corrode due to the one or more operating parameters.

19. The non-transitory computer readable medium of claim 15, comprising instructions configured to cause the processor to send the signal indicating the alert when the predicted degradation values based on the rate of degradation exceed a threshold associated with predicted fouling of the compressor.

20. The non-transitory computer readable medium of claim 15, comprising instructions configured to cause the processor to send the alert indicating advisory information to perform an offline water wash when components within the compressor are expected to have degradation based on the one or more parameters.

* * * * *